(12) United States Patent
Bouchier et al.

(10) Patent No.: US 7,549,039 B2
(45) Date of Patent: Jun. 16, 2009

(54) GENERATING AN INTERRUPT IN A SYSTEM HAVING PLURAL PARTITIONS THAT SHARE A RESOURCE

(75) Inventors: Paul H. Bouchier, Little Elm, TX (US); Bradley G. Culter, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 511 days.

(21) Appl. No.: 11/193,680

(22) Filed: Jul. 29, 2005

(65) Prior Publication Data

US 2007/0028081 A1 Feb. 1, 2007

(51) Int. Cl.
*G06F 13/24* (2006.01)
*G06F 13/26* (2006.01)
*G06F 13/32* (2006.01)
*G06F 15/177* (2006.01)

(52) U.S. Cl. .................. 713/1; 713/2; 713/100; 710/260; 710/263; 710/264; 710/269

(58) Field of Classification Search ............ 713/1, 713/2, 100; 710/260, 263, 264, 269
See application file for complete search history.

(56) References Cited

U.S. PATENT DOCUMENTS

| 6,219,742 | B1 | 4/2001 | Stanley |
| 6,725,317 | B1 | 4/2004 | Bouchier et al. |
| 7,048,877 | B2 * | 5/2006 | Zimmer et al. ............ 710/260 |
| 7,249,270 | B2 * | 7/2007 | Mansell et al. ............ 713/320 |
| 2002/0029266 | A1 * | 3/2002 | Tse et al. .................. 709/224 |
| 2004/0107383 | A1 | 6/2004 | Bouchier et al. |
| 2004/0199832 | A1 | 10/2004 | Powers et al. |
| 2004/0268337 | A1 | 12/2004 | Culter |

OTHER PUBLICATIONS

Hewlett-Packard Corporation et al., "Advanced Configuration and Power Interface Specification," Rev. 3, pp. 1-602, dated Sep. 2, 2004.

* cited by examiner

*Primary Examiner*—Chun Cao
*Assistant Examiner*—Michael J Brown (57) ABSTRACT

A system includes a plurality of partitions having respective operating systems, and a resource shared by the partitions. The resource has plural segments, where a first one of the segments is accessed to invoke a first interrupt. An operating system of a first one of the plurality of partitions invokes, in response to the first interrupt, a routine to cause generation of a second interrupt to a second one of the plurality of partitions.

21 Claims, 4 Drawing Sheets

GENERATING AN INTERRUPT IN A SYSTEM HAVING PLURAL PARTITIONS THAT SHARE A RESOURCE

BACKGROUND

To increase the processing power of computers (such as application server computers, storage server computers, and so forth), multiple processors can be provided in the computers. In some cases, such computers have multiple nodes (or cells), with each node or cell containing multiple processors.

In relatively large multiprocessing computers, it is sometimes desirable to partition the computers into multiple partitions. Each partition can have its own set of resources, such as processors, storage devices, input/output (I/O) devices, operating system, application software, and so forth.

In some cases, certain resources may have to be shared by two or more partitions in a computer. An example of shared resources includes general purpose event (GPE) registers defined by the Advanced Configuration and Power Interface (ACPI) specification. GPE registers are used to report events in the computer. In response to an event, the GPE registers can cause an interrupt to be asserted, such as a system control interrupt (SCI). The interrupt is handled by an operating system. However, in a computer having multiple partitions with respective operating systems, the sharing of resources such as GPE registers may result in the interrupt generated by the GPE registers being detectable by an operating system of a particular partition, with the operating systems of the remaining partitions unable to detect the interrupt generated in response to an event reported by the GPE registers.

The inability of the remaining partitions to detect the interrupt generated by the GPE registers means that such partitions would be unable to detect and handle events (such as hot-plug events in which peripheral devices are requested to be added or removed from the computer) reported by the GPE registers. Merely duplicating the GPE registers in each of the multiple partitions to overcome this issue increases parts costs and wastes chip space.

DETAILED DESCRIPTION

Figure 1:
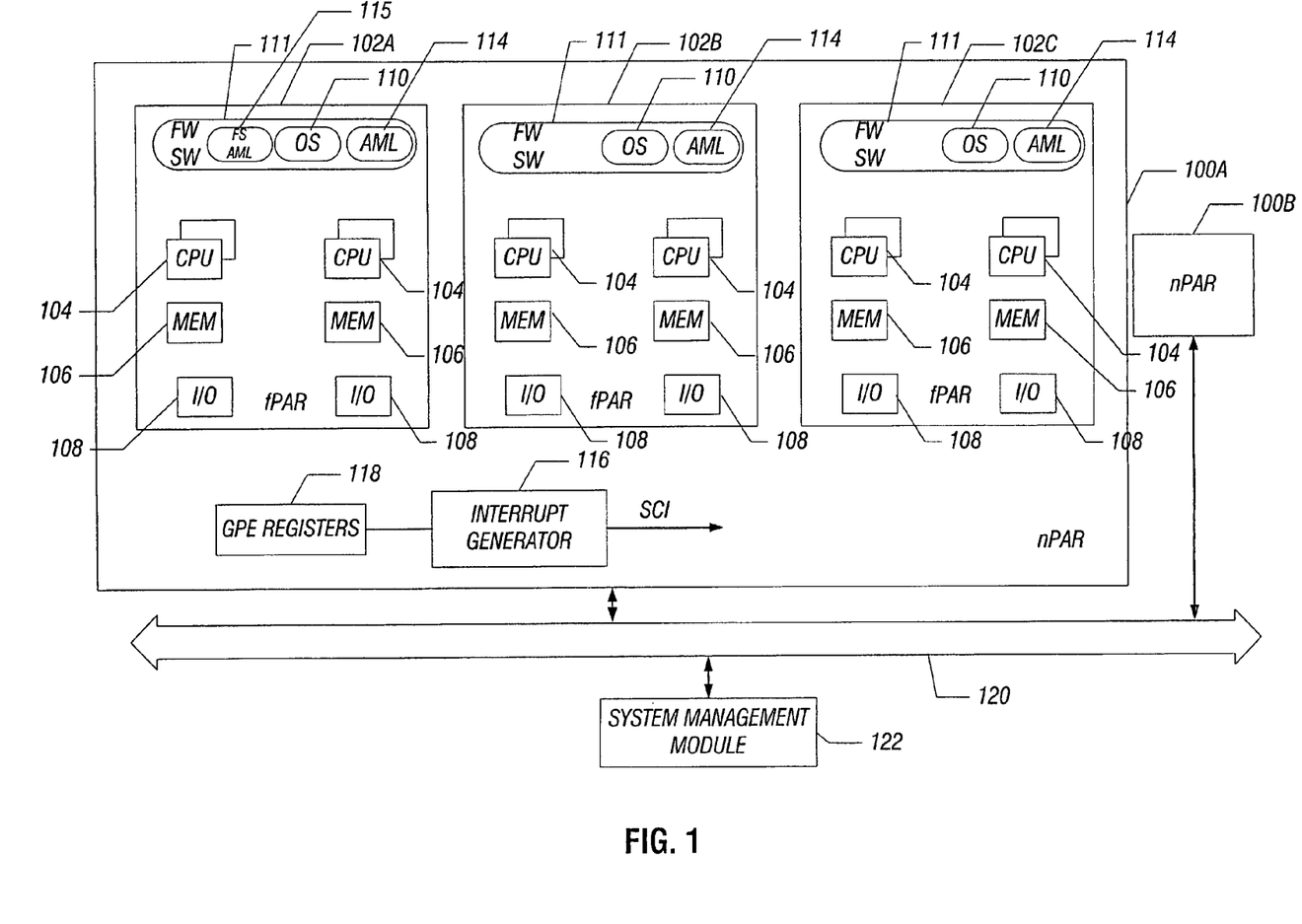
FIG. 1 is a block diagram of a system having multiple partitions that share a set of GPE registers, according to an embodiment.

FIG. 1 illustrates a system according to an embodiment that has multiple "hard partitions" 100 (100A, 100B shown in FIG. 1). Each hard partition, or nPar, includes multiple "firmware partitions" (fPars) 102 (102A, 102B, 102C shown in FIG. 1). A hard partition is a subsection of a partitionable system containing a complete set of resources used to boot and run an operating system. Each hard partition 100 is firewalled off (or electrically isolated) from other hard partitions, usually by hardware. Electrically isolating hard partitions prevents access by central processing units (CPUs) in one hard partition of resources of another hard partition.

A firmware partition (fPar) 102 is a subsection of a hard partition or of a non-partitionable system. Each firmware partition contains CPUs 104, memory 106 (e.g., volatile memory and/or non-volatile storage), and input/output (I/O) boards 108. An "I/O board" refers to an I/O device or a circuit board containing one or more I/O devices. In addition, each firmware partition 102 includes an operating system 110 that is bootable by the components of the firmware partition 102, including the CPUs 104, memory 106, and I/O boards 108. The operating system 110 is part of software and firmware (referenced generally by numeral 111) in the respective firmware partition.

In the example of FIG. 1, each hard partition 100 can include multiple cells, with each cell containing its respective set of CPUs 104 and memory 106. In one example, a cell can be implemented as a circuit board on which components such as CPUs and memory are mounted. In another implementation, a non-cellular type system is employed.

The operating system 110 in each firmware partition 102 is executable on the CPU(s) 104 of the firmware partition 102. Note that firmware partitions are not firewalled off from one another so that a CPU in one firmware partition is able to access resources in another firmware partition.

In other embodiments, instead of having both firmware partitions and hard partitions, one type of partition is used. Thus, more generally, a "partition" refers to any part of a system, such as a computer or other electronic device, where the part includes at least one CPU and an operating system executable on the CPU.

In the example of FIG. 1, each of the firmware partitions 102A, 102B, 102C contains identical components, except that the firmware partition 102A also includes a special ACPI (Advanced Configuration and Power Interface) Machine Language (AML) method 115, referred to as a forward-SCI (system control interrupt) AML method. The forward-SCI AML method 115 is a software routine executable in response to an interrupt generated by an interrupt generator 116. In the implementation depicted in FIG. 1, the interrupt generated by the interrupt generator 116 is an SCI (system control interrupt). An SCI is an interrupt that causes CPUs 104 to execute an interrupt service routine. The interrupt generator 116 receives outputs from GPE (general purpose event) registers 118. GPE registers are used to represent events in the hard partition 100, where such events cause generation of the SCI.

In different embodiments, other types of interrupts aside from SCI can be generated in response to events in the hard partition 100. The GPE registers 118 are one example of resources that can be shared by the plural firmware partitions 102A, 102B, 102C. In other embodiments, other types of resources can be shared by the firmware partitions 102A, 102B, 102C, where such other types of shared resources are capable of causing generation of an interrupt.

Each firmware partition also includes one or more other AML methods 114. In other embodiments, instead of using AML methods 114, 115, the firmware partitions can include other types of software routines that are responsive to interrupts.

The CPUs 104 of the firmware partitions 102A, 102B, 102C (as well as CPUs in similar firmware partitions in other hard partitions) communicate over an interconnect structure 120. The example system of FIG. 1 also includes a system management module 122 to perform system management tasks with respect to the components of the system depicted in FIG. 1.

In the ensuing discussion, reference is made to firmware partitions and hard partitions. However, note that the techniques and mechanisms described below can be applied to other types of partitions of a system.

In the hard partition 100A, the firmware partition 102A is a "hot firmware partition" (or hot fPar). The hot firmware partition owns certain unitary, non-sharable resources, including the set of GPE registers 118 and the SCI generated in response to the GPE registers 118. All non-hot firmware partitions in a hard partition or in a non-partitionable system are referred to as "warm firmware partitions."

Because the hot firmware partition 102A owns the set of GPE registers 118 and the SCI generated in response to the GPE registers 118, any event detected by the GPE registers 118 causes the SCI to be routed to the hot firmware partition 102A, and not to the remaining warm firmware partitions 102B, 102C. If mechanisms according to some embodiments were not used, only the operating system in the hot firmware partition 102A would be able to respond to events represented by the GPE registers. If mechanisms according to some embodiments were not used, the remaining operating systems in other firmware partitions 102B, 102C would not have a trigger source, and thus would not be able to handle events represented by the GPE registers 118.

For example, events represented by the GPE registers include hot-plug events. A hot-plug event is an event in which a component is hot inserted or hot removed from slots of cells or I/O boards 108. If only the operating system 110 in the hot firmware partition 102A is able to detect hot-plug events, then hot inserting and hot removing components can only occur in the hot firmware partition 102A, but not in the other firmware partitions 102B, 102C.

To address this issue, in accordance with some embodiments of the invention, the set of GPE registers 118 is divided into multiple portions, with the portions allocated to respective firmware partitions. Thus, for example, if the hot partition 100A includes three firmware partitions 102A, 102B, and 102C, then the set of GPE registers can be divided into three portions, one for each firmware partition. Note that the portions of the GPE registers for the different firmware partitions do not have to be equal in size.

By dividing the set of GPE registers 118 into multiple portions, events for different firmware partitions will cause bits in corresponding ones of the portions of the set of GPE registers 118 to be set. For example, if an event for warm firmware partition 102B were to occur, then a status bit in the portion of GPE registers 118 corresponding to firmware partition 102B would be set. In addition, a special indicator (which can be in the form of a predetermined GPE status register bit) can also be set to cause generation of the SCI by the interrupt generator. This SCI is handled by the forward-SCI AML method 115 in the hot firmware partition 102A. The forward-SCI AML method 115 is invoked for the purpose of forwarding the SCI, detected by the hot firmware partition 102A, to a different firmware partition, in this case, firmware partition 102B. Note that the warm firmware partition 102B is unable to directly detect the activated SCI, even though the event that occurred was for the warm firmware partition 102B. The forwarding of the SCI by the hot firmware partition 102A to the warm firmware partition 102B allows for indirect detection of the SCI.

The forward-SCI AML method 114 effectively forwards an interrupt to the operating system 110 of the firmware partition 102B. Forwarding the interrupt from the firmware partition 102A to the firmware partition 102B can be accomplished by accessing some shared resource, such as an I/O resource, a memory resource, or some other indicator for indicating that an interrupt received by one firmware partition (the hot firmware partition) is being forwarded to a selected other firmware partition (a warm firmware partition). The operating system 110 in the warm firmware partition 102B receives this forwarded interrupt. In response, either the operating system 110 of the firmware partition 102B, or another routine in the firmware partition 102B, is invoked to access the portion of the GPE registers 118 corresponding to the firmware partition 102B to detect the event. The operating system or other routine in the firmware partition 102B would then take appropriate action in response to this event, such as to invoke an AML method 114.

Although described in the context of GPE registers, it is noted that the interrupt forwarding feature can be applied to other types of shared resources in other embodiments.

In accordance with an example embodiment, the set of GPE registers 118 in the hard partition 100A includes one or plural GPE register groups. A GPE register group includes one or two GPE register blocks. A GPE register block is a contiguous group of GPE status and enable registers as specified by ACPI, and their associated triggering logic. Each GPE register block can be divided into multiple GPE register segments, according to some embodiments. Thus, a GPE register segment is a subsection of a GPE register block, containing one or more status bits and corresponding one or more enable bits. The concept of "GPE register group" and "GPE register block" can be omitted in other implementations. More generally, a "GPE register segment" is considered a subsection of a GPE register.

A "GPE bank" is a grouping of GPE segments. A GPE bank can include one GPE segment, or plural GPE segments. A GPE bank is accessed at a base address that identifies the particular bank. Multiple GPE banks in the GPE register group are associated with respective unique addresses. Each GPE bank is allocated to a specific firmware partition. Thus, a first GPE bank is allocated to a first firmware partition, a second GPE bank is allocated to a second firmware partition, and so forth. A GPE bank is one example of a "portion" of the set of GPE blocks 118 described above that is allocated to a respective firmware partition.

Figure 2:
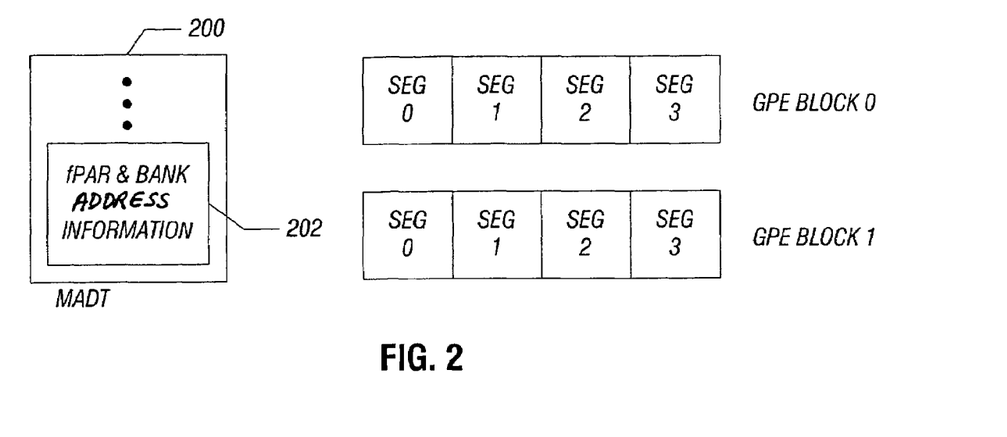
FIG. 2 illustrates segments of the GPE registers, according to an embodiment.

FIG. 2 shows two GPE register blocks (GPE block 0 and GPE block 1). As shown in FIG. 2, GPE block 0 includes four segments, and GPE block 1 also includes four segments. The number of segments can be flexibly allocated to firmware partitions such that a firmware partition can own zero, one, or more segments. Allocation of GPE banks (and the segments contained in each bank) to a firmware partition is indicated by firmware partition and bank address information 202 contained in a multiple APIC description table (MADT) 200, defined by ACPI. Note that in a different embodiment, another type of table or another data structure can be used for storing information to allocate GPE banks (or other types of portions of GPE registers) to corresponding firmware partitions.

In one example, three firmware partitions can be present in the hard partition, including firmware partitions fPar0, fPar1, and fPar2 (102A, 102B, and 102C, respectively, in FIG. 1). In one implementation, segment 0 of GPE register block 0 can be allocated to fPar0, segment 1 of GPE register block 0 can be allocated to fPar1, and segments 2 and 3 of GPE register block 0 can be allocated to fPar2. In this example implementation, segment 0 of GPE block 0 is part of bank 0 (allocated to fPar0), segment 1 of GPE register block 0 is part of bank 1 (allocated to fPar1), and segments 2 and 3 of GPE register block 0 can be part of bank 2 (allocated to fPar2). The segments of GPE register block 1 can be allocated to other banks for other firmware partitions. Alternatively, note that segments of GPE register block 1 can also be part of banks 0, 1, and/or 2 discussed above for fPar0, fPar1, and fPar2. The fPar and bank address information 202 in the MADT 200 enables flexible allocation of segments of GPE register blocks 0 and 1 to respective banks. Note also that although the description focuses on allocation of segments of GPE register blocks of one GPE register group to firmware partitions, it is noted that in a system with multiple groups of GPE registers, segments from different groups can be allocated to respective firmware partitions.

Figure 3:
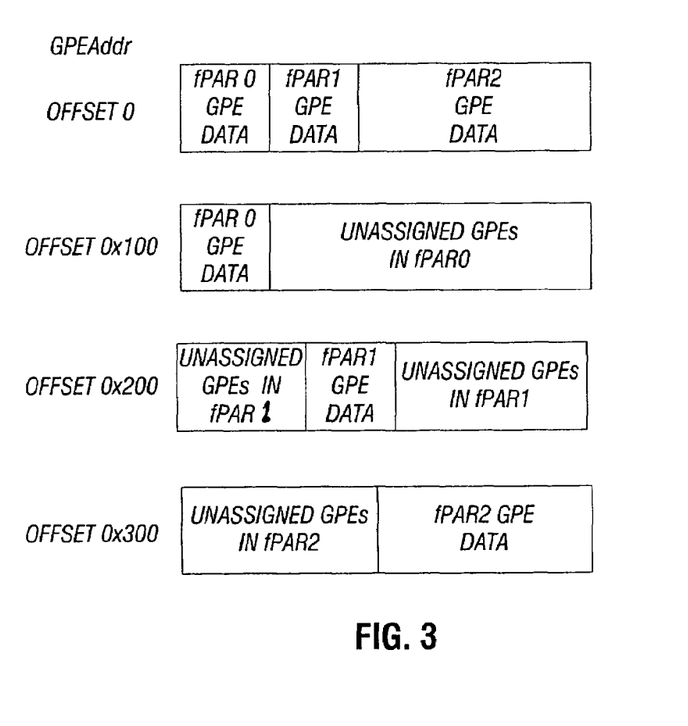
FIG. 3 illustrates content of the GPE registers at different addresses, according to an embodiment.

As an example, FIG. 3 shows the content of status registers of GPE register block 0 in response to different GPE addresses (GPEAddr). In the example of FIG. 3, four example GPE addresses are listed: offset 0, offset 0x100, offset 0x200, and offset 0x300. Note that the specific GPE addresses provided are for exemplary purposes, as other implementations can use other addresses for accessing content of the GPE registers. In response to GPEAddr having value offset 0, GPE data for all three banks (assigned to banks 0, 1, and 2 discussed with the example above) appear to system firmware or software 111 (FIG. 1). This feature is provided to enable compatibility with legacy systems that have visibility to all segments of the GPE registers.

The other GPEAddr values (e.g., 0x100, 0x200, 0x300) are associated with different parts of the GPE status registers. Association between GPEAddr values and parts of the GPE status registers is maintained in a segment bank mapping register 320. For example, the segment bank mapping register 320 can have 4 groups of 4 bits. Each group can map one of the 4 GPE register segments 304, 306 in the exemplary segment interrupt blocks 302 to a GPEAddr value 0x1xx-0xfxx (assuming comparator 310 compares the 4 segment bank mapping bits with bits 11-8 of GPEAddr). The GPEAddr values are reported to each fPar's operating system by the MADT tables 200. In response to GPEAddr having value offset 0x100, the GPE data in bank 0 for fPar0 becomes visible to system firmware or software (assuming the segment bank mapping register was initialized so as to drive Bank 0 ID with 1). However, the GPE data in banks 1 and 2 are not visible. Similarly, in response to GPEAddr having a value with offset 0x200, the GPE data in bank 1 for fPar1 would become visible to system firmware or software (assuming the segment bank mapping register was initialized so as to drive Bank1 ID with 2. The remaining GPE data in GPE block 0 would not be visible. In response to GPEAddr having value offset 0x300, the GPE data in bank 2 for fPar2 would be visible, but not the remaining GPE data in GPE block 0. In this manner, software or firmware 111 (FIG. 1) running in a respective firmware partition 102 can selectively access the portion (e.g., bank) of the set of GPE registers 118 allocated to the respective firmware partition 102.

Figure 4:
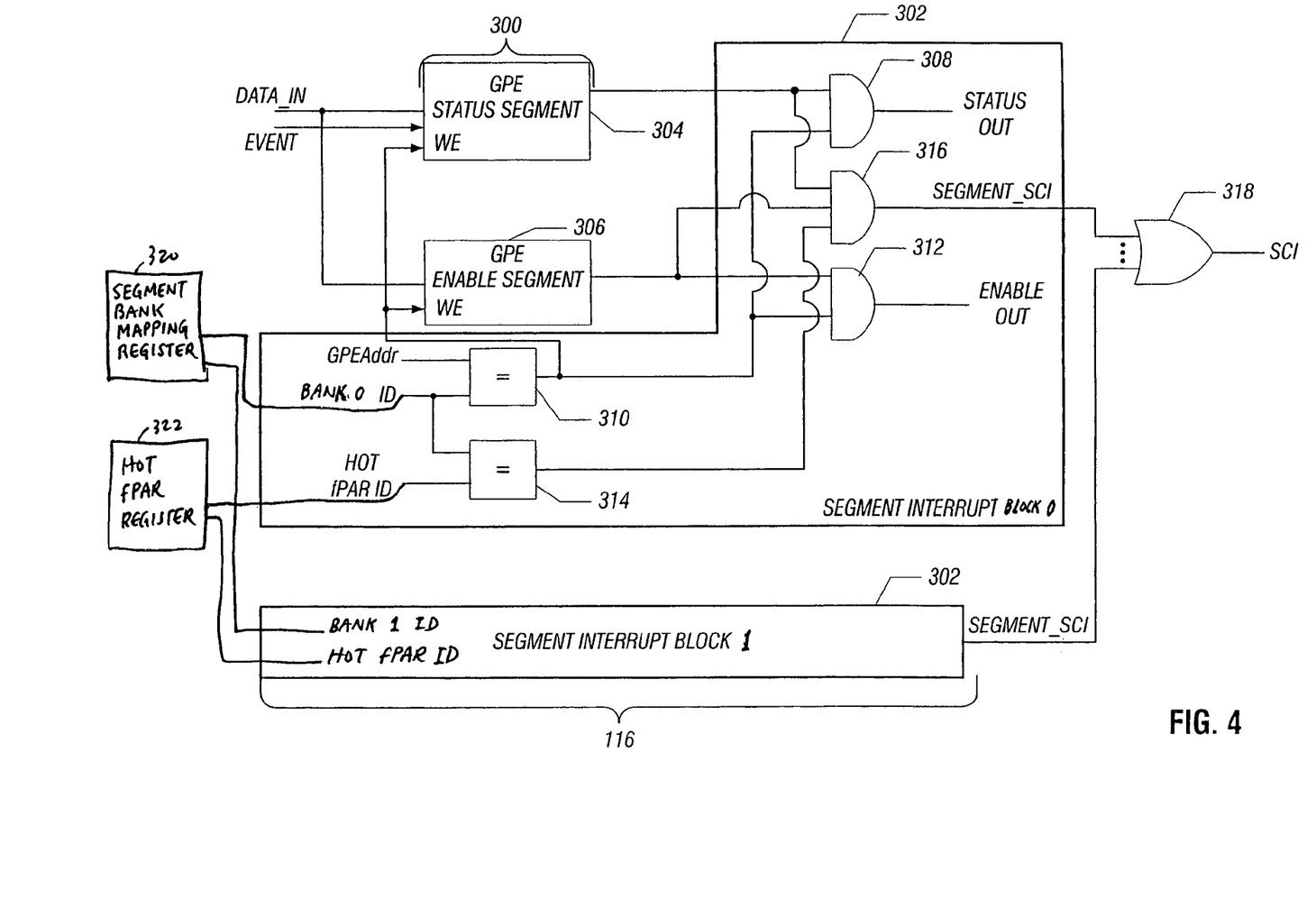
FIG. 4 is a block diagram of logic to generate an interrupt in response to access of the GPE registers, in accordance with an embodiment.

FIG. 4 shows logic in the interrupt generator 116. Each segment 300 of a GPE register block is associated with a respective segment interrupt block 302. Each GPE block segment 300 contains a GPE status register segment 304 (which contains status bits) and a GPE enable register segment 306 (which contains GPE enable bits). Note that each GPE register contains an enable register and a status register. The bits of the enable register specify whether a corresponding status bit is to be enabled. If a GPE enable bit is set, then the corresponding GPE status bit, when set, would cause generation of an SCI. A GPE status bit is set in response to a corresponding event occurring in the system, such as a hot-plug event or other event.

Each segment interrupt block 116 can correspond to one or multiple GPE bits; the GPE status register segment 304 and GPE enable register segment 306 includes the same number of one or multiple bits. In the multi-bit context, gates 308, 312, 316 depicted in FIG. 4 are replicated for each bit, and the output of gates 308, 312, and 316 can be considered multi-bit buses.

The GPE status register segment 304 receives an Event input to enable occurrence of an event to be communicated to a corresponding bit of the GPE status register segment 304 for the purpose of setting the bit. The content of the GPE status register segment 304 and GPE enable register segment 306 in the GPE block segment 300 can also be modified by input data bits Data_In. Data_In can be used to clear a bit previously set in the GPE enable register segment 306. The GPE status register segment 304 and GPE enable register segment 306 each has a write enable (WE) input that is connected to the output of a comparator 310.

The comparator 310 activates its output in response to the GPE address (GPEAddr) matching the bank identifier (bank ID). Each bank is assigned a unique bank ID. Segments allocated to a particular bank are assigned the corresponding bank ID in the segment bank mapping register. Thus, if GPEAddr is equal to the bank ID, as determined by the comparator 310, then the output of the comparator is activated to enable writes to the GPE status register segment 304 (using either the Data_In or Event input) and writes to the GPE enable register segment 306 (using the Data_In input). Also, activation of the output of the comparator 310 enables the AND logic 308 to allow the GPE status register bit(s) of segment 304 to pass through to the output Status Out. Similarly, the content of the GPE enable register segment 306 is allowed to pass through AND logic 312 to output Enable Out in response to activation of the output of the comparator 310. The AND logic 308 and AND logic 312 can drive their output signal(s) through a multiplexer or tristate buffer (not shown) or other device onto a bus that can be read by any CPU 104.

The status register bit(s) of each segment correspond to respective events in the corresponding fPar. One of the GPE bits for the hot fPar is assigned special meaning, in accordance with some embodiments. This special GPE bit is referred to as a forward-SCI status bit. The forward-SCI status bit is set when an event for a warm fPar has occurred. Setting the forward-SCI status bit causes SCI to be asserted, which in turn causes handling of the SCI by the operating system in the hot fPar. In response to detecting that the forward-SCI status bit is set, the operating system in the hot fPar invokes the forward-SCI AML method 115 (FIG. 1) to forward the SCI to the warm fPar associated with the event that has occurred.

A Segment_SCI signal is generated by AND logic 316 in response to activation of any GPE status bit where the corresponding GPE enable bit is set, and where the bank ID of the segment is a hot fPar ID, as determined by a comparator 314. The hot fPar ID is the identifier of the hot fPar, stored in a hot fPar register 322. Thus, according to the logic of the segment interrupt block 302, a segment interrupt block assigned to the hot fPar is allowed to activate Segment_SCI in response to activation of an enabled GPE status register bit. Since the hot fPar owns the GPE registers, the hot fPar is able to detect the SCI generated by the interrupt generator 116. As discussed above, the hot fPar includes a forward-SCI AML method (115 in FIG. 1) to forward an interrupt intended to a warm fPar.

The outputs Segment_SCI from the multiple segment interrupt blocks are fed to OR logic 318, which activates the interrupt SCI in response to activation of any Segment_SCI from any of the segment interrupt blocks 302.

Note that although a segment interrupt block 302 associated with the hot fPar (but not a warm fPar) is able to activate Segment_SCI, the Status Out and Enable Out outputs from each segment interrupt block 302 is accessible by the respective fPar (whether the fPar is a hot fPar or a warm fPar). This ability to read the Status Out and Enable Out outputs allows for the interrupt forwarding capability, according to some embodiments, described below.

Figure 5:
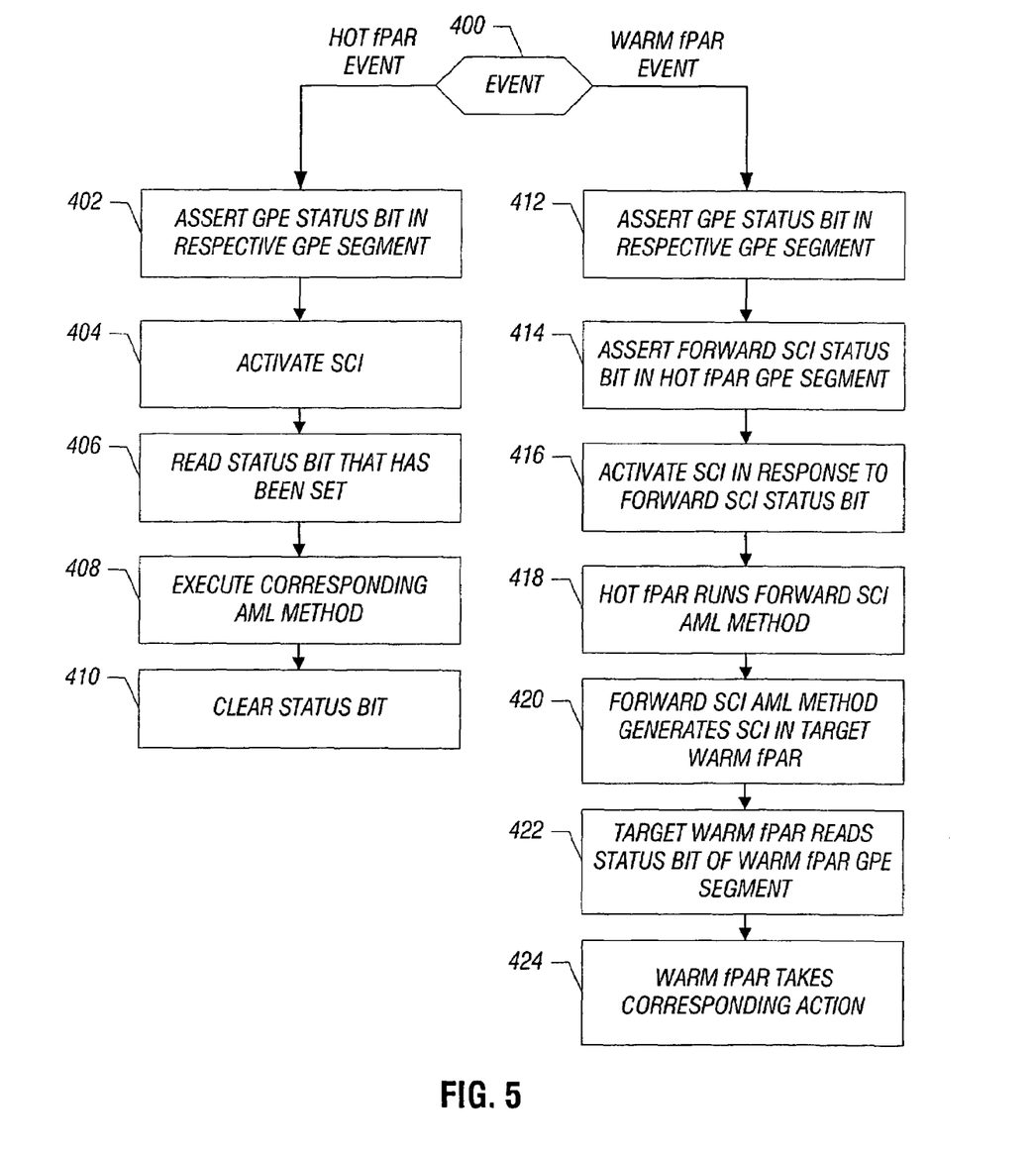
FIG. 5 is a flow diagram of generating and handling an interrupt in response to an event indicated by the GPE registers, according to an embodiment.

FIG. 5 shows a flow diagram of a process according to an embodiment. Upon receipt of an event (400), processing differs depending upon whether the event is a hot Par event or a warm fPar event. A hot fPar event is an event that occurs in the hot fPar, whereas a warm fPar event is an event that occurs in one of the warm fPars.

In response to a hot fPar event, the system asserts (at 402) a corresponding GPE status register bit in the respective GPE segment(s) (allocated to the hot fPar). Assertion of the GPE status bit in the hot fPar GPE segment(s) causes activation of the SCI (at 404) by one of the segment interrupt blocks 302 in FIG. 4. In response to the SCI, the operating system in the hot fPar reads (at 406) the GPE register status bit that has been set. The operating system in the hot fPar then executes (at 408) the corresponding AML method 114 (in the hot fPar) to process the interrupt (such as to perform a hot-plug task or other task). Next, the operating system of the hot fPar clears (at 410) the GPE status register bit that was set.

In response to a warm fPar event, the system asserts (at 412) a GPE status register bit in the respective GPE segment(s) (allocated to the warm fPar). The system also asserts (at 414) the forward-SCI status register bit in the proper hot fPar GPE segment. Thus, according to some embodiments of the invention, in response to a warm fPar event, status bits in at least two GPE segments are activated, one in the warm fPar GPE segment(s), and one in the hot fPar GPE segment(s). This is done because SCI is generated only in response to setting of a GPE status bit in a hot fPar segment.

Next, the SCI is activated (at 416) in response to the forward-SCI status register bit. The operating system in the hot fPar reads the status bit in the hot fPar segment(s), and determines that the status bit that has been set is the forward-SCI status register bit. The operating system in the hot fPar then runs (at 418) the forward-SCI AML method 115 (FIG. 1). The forward-SCI AML method 115 generates (at 420) an SCI in the target warm fPar. Generation of the SCI in the target warm fPar by the forward-SCI AML method 115 is accomplished by one of various different techniques, such as sending an interrupt bus transaction to a CPU 104 in the warm fPar, or programming a storage location in I/O storage space, memory storage space, or some other shared resource. In response to the SCI generated by the forward-SCI AML method, the operating system in the target warm fPar reads (at 422) the GPE status bit in the corresponding warm fPar GPE segment(s). The operating system in the warm fPar then launches the appropriate code, such as an AML method in the warm fPar, to take corresponding action (at 424).

Instructions of software modules described above are loaded for execution on corresponding CPUs. The CPUs include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
   a plurality of partitions having respective operating systems;
   a resource shared by the partitions, the resource having plural segments, wherein a first one of the segments is accessed to invoke a first interrupt; and
   the operating system of a first one of the plurality of partitions to, in response to the first interrupt, invoke a routine to cause generation of a second interrupt to a second one of the plurality of partitions,
   wherein in response to an event, an indicator in the first one of the segments corresponding to the first partition is set, and an indicator in a second one of the segments corresponding to the second partition is set;
   wherein the first interrupt is in response to setting the first indicator in the first segment; and
   wherein the operating system in the second partition is responsive to the second interrupt by reading the indicator in the second segment.

2. The system of claim 1, wherein the shared resource comprises general purpose event (GPE) registers.

3. The system of claim 2, wherein the first interrupt comprises a system control interrupt (SCI).

4. The system of claim 1, further comprising plural banks of the resource, each bank allocated at least one segment, and the plural banks allocated to respective partitions.

5. The system of claim 4, wherein a segment allocated to one of the banks is not allocated to any other bank.

6. The system of claim 1, further comprising plural interrupt blocks corresponding to the plural segments of the resource, the plural interrupt blocks adapted to output respective interrupt signals,
   wherein the first interrupt is activated in response to activation of any of the interrupt signals.

7. The system of claim 6, wherein each of the interrupt blocks receives an input address, each of the interrupt blocks including a comparator to compare the input address to an identifier of the first partition,
   each of the interrupt blocks to enable activation of the corresponding interrupt signal in response to the comparator indicating a match between the input address and the identifier of the first partition.

8. The system of claim 1, wherein the invoked routine comprises an Advanced Configuration and Power Interface (ACPI) machine language (AML) routine.

9. A system comprising:
   a plurality of partitions having respective operating systems;
   a resource shared by the partitions, the resource having plural segments, wherein a first one of the segments is accessed to invoke a first interrupt; and the operating system of a first one of the plurality of partitions to, in response to the first interrupt, invoke a routine to cause generation of a second interrupt to a second one of the plurality of partitions, wherein the shared resource comprises general purpose event (GPE) registers, wherein each of the partitions has at least one processor, and wherein the plurality of partitions comprise partitions of a first type, wherein a processor in one of the partitions of the first type is able to access another resource in another one of the partitions of the first type, the system further comprising partitions of a second type, each partition of the second type having multiple partitions of the first type, wherein a processor in one of the partitions of the second type is unable to access another resource in another partition of the second type.

10. The system of claim 9, wherein the partitions of the first type comprise firmware partitions and wherein partitions of the second type comprise hard partitions.

11. A method for use in a system having plural partitions having respective operating systems, comprising:

accessing a resource shared by the plural partitions in response to an event, the shared resource divided into plural segments, the plural segments being allocated to respective plural partitions, wherein an indicator in a first one of the plural segments corresponding to a first one of the plural partitions is set in response to the event, and wherein an indicator in a second one of the plural segments corresponding to a second one of the plural partitions is set in response to the event;

activating a first interrupt in response to setting the indicator in the first segment, the first interrupt received by an operating system in the first partition;

invoking, by the operating system, a routine in the first partition to handle the first interrupt, the routine to forward the first interrupt to the second partition to cause an operating system in the second partition to read the indicator in the second segment.

12. The method of claim 11, wherein accessing the resource comprises accessing general purpose event (GPE) registers, wherein the plural segments comprise plural segments of the GPE registers.

13. The method of claim 12, wherein accessing the GPE registers shared by the plural partitions is in response to a hot-plug event.

14. The method of claim 11, wherein activating the first interrupt comprises activating a system control interrupt (SCI).

15. The method of claim 11, wherein the resource is owned by the first partition, and wherein the first interrupt is detectable by the first partition but not by the second partition.

16. A method for use in a system having plural partitions having respective operating systems, comprising:

accessing a resource shared by the plural partitions in response to an event, the shared resource divided into plural segments, the plural segments being allocated to respective plural partitions;

activating a first interrupt in response to accessing the resource, the first interrupt received by an operating system in a first one of the partitions;

invoking, by the operating system, a routine in the first partition to handle the first interrupt, the routine to forward the first interrupt to a second one of the partitions, wherein the plural partitions comprise a first partition and at least a second partition, wherein the resource is owned by the first partition, and wherein the first interrupt activated in response to accessing the resource is detectable by the first partition but not by at least the second partition, wherein forwarding the first interrupt to a second one of the partitions comprises the routine performing one of (1) sending an interrupt bus transaction to a processor in the second partition; and (2) accessing a shared storage location to cause activation of an interrupt to the second partition.

17. An article comprising at least one storage medium containing instructions that when executed cause a system to perform programmed tasks, the system including plural partitions having respective operating systems, the system having a resource shared by the plural partitions, the resource having plural segments corresponding to respective partitions, the instructions when executed causing the system to:

in response to an event, set an indicator in a first one of the plural segments and an indicator in a second one of the plural segments;

receive, by a first operating system in a first one of the partitions, a first interrupt in response to the indicator set in the first segment;

invoke, by the first operating system, a routine in response to the first interrupt;

cause generation of a second interrupt, by the routine, that is provided to the second partition; and cause a second operating system in the second partition to access the indicator set in the second segment in response to the second interrupt.

18. The article of claim 17, wherein receiving the first interrupt in response to the indicator comprises receiving the first interrupt in response to the indicator set in the first segment of the shared resource based on the event for the second partition.

19. A system comprising:

plural partitions having respective operating systems;

a resource shared by the plural partitions, the shared resource divided into plural segments, the plural segments being allocated to respective plural partitions;

means for setting an indicator in a first one of the plural segments corresponding to a first one of the plural partitions and an indicator in a second one of the plural segments corresponding to a second one of the plural partitions in response to an event;

means for activating a first interrupt in response to setting the indicator in the first segment, the first interrupt received by an operating system in the first partition, wherein the operating system in the first partition is to invoke a routine in the first partition to handle the first interrupt, the routine to generate a second interrupt to the second partition, wherein the operating system in the second partition is to read the indicator set in the second segment in response to the second interrupt.

20. The system of claim 19, wherein the shared resource comprises general purpose event (GPE) registers.

21. A system comprising:

a plurality of partitions having respective operating systems;

general purpose event (GPE) registers shared by the partitions, the GPE registers divided into plural segments allocated to respective partitions, the plural segments comprising GPE status bits, wherein a first GPE status bit in a first one of the segments and a second GPE status bit in a second one of the segments are set in response to occurrence of an event, the first segment allocated to a first one of the plural partitions, the second segment allocated to a second one of the plural partitions, and the event associated with the second partition, wherein the operating system in the first partition invokes, in response to a first interrupt generated based on setting the first GPE status bit, a routine in the first partition to cause generation of a second interrupt to the second partition, and wherein the operating system in the second partition reads in response to the second interrupt, the second GPE status bit.

* * * * *

UNITED STATES PATENT AND TRADEMARK OFFICE
CERTIFICATE OF CORRECTION

PATENT NO. : 7,549,039 B2  
APPLICATION NO. : 11/193680  
DATED : June 16, 2009  
INVENTOR(S) : Paul H. Bouchier et al.

Page 1 of 1

It is certified that error appears in the above-identified patent and that said Letters Patent is hereby corrected as shown below:

In column 7, line 8, delete "Par" and insert -- fPar --, therefor.

In column 9, line 18, in Claim 10, delete "firmware partitions" and insert -- firmware partitions, --, therefor.

In column 12, line 4, in Claim 21, delete "reads" and insert -- reads, --, therefor.

Signed and Sealed this

Third Day of November, 2009

David J. Kappos
*Director of the United States Patent and Trademark Office*